US007676318B2

(12) United States Patent
Allain

(10) Patent No.: US 7,676,318 B2
(45) Date of Patent: Mar. 9, 2010

(54) REAL-TIME, TABLE-BASED ESTIMATION OF DIESEL ENGINE EMISSIONS

(75) Inventor: Marc Christian Allain, Plymouth, MI (US)

(73) Assignee: Detroit Diesel Corporation, Detroit, MI (US)

( * ) Notice: Subject to any disclaimer, the term of this patent is extended or adjusted under 35 U.S.C. 154(b) by 272 days.

(21) Appl. No.: 11/943,826

(22) Filed: Nov. 21, 2007

(65) Prior Publication Data

US 2008/0149081 A1 Jun. 26, 2008

Related U.S. Application Data

(60) Provisional application No. 60/877,074, filed on Dec. 22, 2006.

(51) Int. Cl.
*G06F 19/00* (2006.01)
*G06F 11/30* (2006.01)

(52) U.S. Cl. ........................ 701/103; 701/110; 702/182

(58) Field of Classification Search ......... 701/101-105, 701/109-111, 115; 123/568.11, 568.21, 123/672; 60/274, 285, 299-300, 311; 702/182-185, 702/187, 188
See application file for complete search history.

(56) References Cited

U.S. PATENT DOCUMENTS

| | | | | |
|---|---|---|---|---|
| 5,431,042 | A | 7/1995 | Lambert et al. | |
| 5,703,777 | A | 12/1997 | Buchhop et al. | |
| 6,311,484 | B1 * | 11/2001 | Roth et al. | 60/301 |
| 6,339,742 | B2 | 1/2002 | Weisman, II | |
| 6,446,430 | B1 * | 9/2002 | Roth et al. | 60/286 |
| 6,671,614 | B2 | 12/2003 | Weisman, II et al. | |
| 6,742,330 | B2 * | 6/2004 | Genderen | 60/286 |
| 6,755,022 | B2 * | 6/2004 | Kim et al. | 60/608 |
| 6,826,906 | B2 * | 12/2004 | Kakwani et al. | 60/303 |
| 6,866,030 | B1 * | 3/2005 | Sun et al. | 123/568.21 |
| 6,968,831 | B2 * | 11/2005 | Kim et al. | 123/568.11 |
| 7,073,481 | B2 * | 7/2006 | Glenn et al. | 123/305 |
| 7,123,971 | B2 * | 10/2006 | Piche | 700/19 |
| 7,143,578 | B2 * | 12/2006 | Kakwani et al. | 60/286 |
| 7,150,145 | B2 * | 12/2006 | Patchett et al. | 60/286 |
| 7,155,334 | B1 | 12/2006 | Stewart et al. | |
| 7,212,908 | B2 | 5/2007 | Li et al. | |
| 2007/0142975 | A1 * | 6/2007 | Piche | 700/286 |

* cited by examiner

*Primary Examiner*—Willis R Wolfe, Jr.
(74) *Attorney, Agent, or Firm*—Bill C. Panagos; Rader, Fishman & Grauer, PLLC

(57) ABSTRACT

A real-time, on board, diesel engine emissions estimation with an empirical, table-based approach that accounts for up to eight (8) input parameters, for optimum emissions estimation under steady state or transient engine operation. The method considers a steady state NOx model, steady state Particulate Matter model, transient NOx model and transient Particulate Matter models to populate a table in memory. The switch between steady state and transient models, real time emissions estimations is based on the rate of change of engine speed (RPM). If the rate of change of RPM exceeds a predetermined threshold, transient models for NOx and Particulate Matter are used to operate the engine and reduce emissions of NOx and Particulate Matter.

10 Claims, 5 Drawing Sheets

REAL-TIME, TABLE-BASED ESTIMATION OF DIESEL ENGINE EMISSIONS

CROSS-REFERENCE TO RELATED APPLICATIONS

The present application claims priority from U.S. Provisional Patent Application No. 60/877,074 entitled "Real-Time Table Based Estimation of Engine Emissions" filed Dec. 22, 2006.

BACKGROUND OF THE INVENTION

Accurate, real-time estimation of engine-out emissions is made difficult by the computationally intensive nature of phenomenological engine emissions models, which prevents real-time operation when applied to engine control units (ECU). It is therefore desirable to provide real-time, on-board diesel engine emissions estimation with an empirical, table-based approach that accounts for up to eight (8) input parameters, for optimum emissions estimation under steady-state or transient engine operation. Such emissions estimation is rendered necessary because diesel particulate filters (DPF) controls require some estimation of engine-out NOx (for passive regeneration purposes) and engine-out PM (for filter loading purposes), and no such physical sensors exist, which meet the durability and reliability requirements associated with heavy duty truck applications.

1. Field of the Invention

The present invention relates to a method to provide real-time, on-board diesel engine emission estimation with an empirical, table based approach that accounts for eight (8) parameters, for optimum emissions estimation under steady state or transient engine operation.

2. Detailed Description of the Related Art

Lambert. et al., U.S. Pat. No. 5,431,042 discloses an engine emissions analyzer wherein internal combustion engine emissions information is generated and monitoring engine events that significantly impact engine emissions and by applying the monitored events to a model of the emissions impact of such events. The monitored events and the emissions impact derived from the model are made visible to the engine operator in a real-time format, and further may be made available to a third party through analysis.

Specifically, Lambert, et al., '042 uses presently available operating parameters that may define operating ranges in which the engine emission reduction technology provides a significant emissions reduction benefit are monitored and logged, and are displayed to the engine operator in a substantially real-time format. The logged parameters are periodically applied to a set of predetermined functions derived to map the logged parameters into real-time information on engines emissions, which likewise maybe displayed to the engine operator, for example in a substantially real-time format. The logged parameters may be downloaded to an off board apparatus at prescribed time intervals for application to one or more models to derived engine emissions estimates for the time periods between such intervals.

Buchhop. et al., U.S. Pat. No. 5,703,777 disclose a parametric emissions monitoring system for monitoring stationary engine/compressor units coupled to a pipeline. The system provides in a reciprocating embodiment, reliable and accurate determination levels for NOx, CO and total hydrocarbons from and emissions matrix primarily as a function of engine speed and engine torque. Variations of the determined emissions level is provided by comparing the values of a set of actual engine operating parameters where the respective value in a set of calculated engine operating parameters to determine whether the derivation of the actual operating parameter from the expected operating parameter is within a defined range. That range, and thus whether the engine is operating within a defined control envelope. Each set of engine operating parameters includes spark ignition, timing, fuel rate, and air manifold pressure. When the comparison indicates that the actual engine operating parameters diverge from an expected engine operating parameters, the emission are determined from the emissions matrix, and are subjected to a bios factor being assessed against the NOx, CO, and total hydrocarbon emissions level, the bios factor depending on the severity of the deviation. Moreover, these biased emission levels are further biased relatively up or down depending on selected ambient operating conditions, including relative humidity, power cylinder exhaust temperature deviation, and air manifold temperature.

Li, et al., U.S. Pat. No. 7,212,908 discloses a method for reducing nitrogen oxides and particulate matter in compression ignition emissions. The method includes monitoring at least one engine sensor that generates a signal in response to at least one engine operating condition, and adjusting at least one engine control parameter in response to the signal such that in cylinder spatial distribution of equivalence ratios and temperature is substantially retained to an operating region. The operating region corresponds to a set of equivalence ratio with respect to temperature values that are substantially outside regions supportive of NOx and particulate matter formation. The temperature values are greater than 1650 k, and the equivalence ratios are great than 0.5.

BRIEF SUMMARY OF THE INVENTION

The present invention relates to a method to estimate engine emissions on-board the engine control unit (ECU) of an electronically controlled diesel engine; said engine further equipped with an ignition and at least one sensor adapted to transmit data signals from the intake manifold such as intake air pressure and temperature, and additional signals such as exhaust gas recirculation (EGR) flow rate. Said method comprising:

using engine sensor electronic signals as inputs to an empirical, table-based model of a diesel engine exhaust emissions;

calculating the sum of individual correlations between exhaust emissions and multiple inputs such as engine RPM, engine load, EGR flow rate, airflow rate to estimate the concentration or flow rate of diesel engine exhaust emissions, and using the real-time estimated exhaust emissions to control regeneration of a diesel engine exhaust particulate matter (PM) filter.

DETAILED DESCRIPTION OF THE PREFERRED EMBODIMENT(S)

Figure 1:
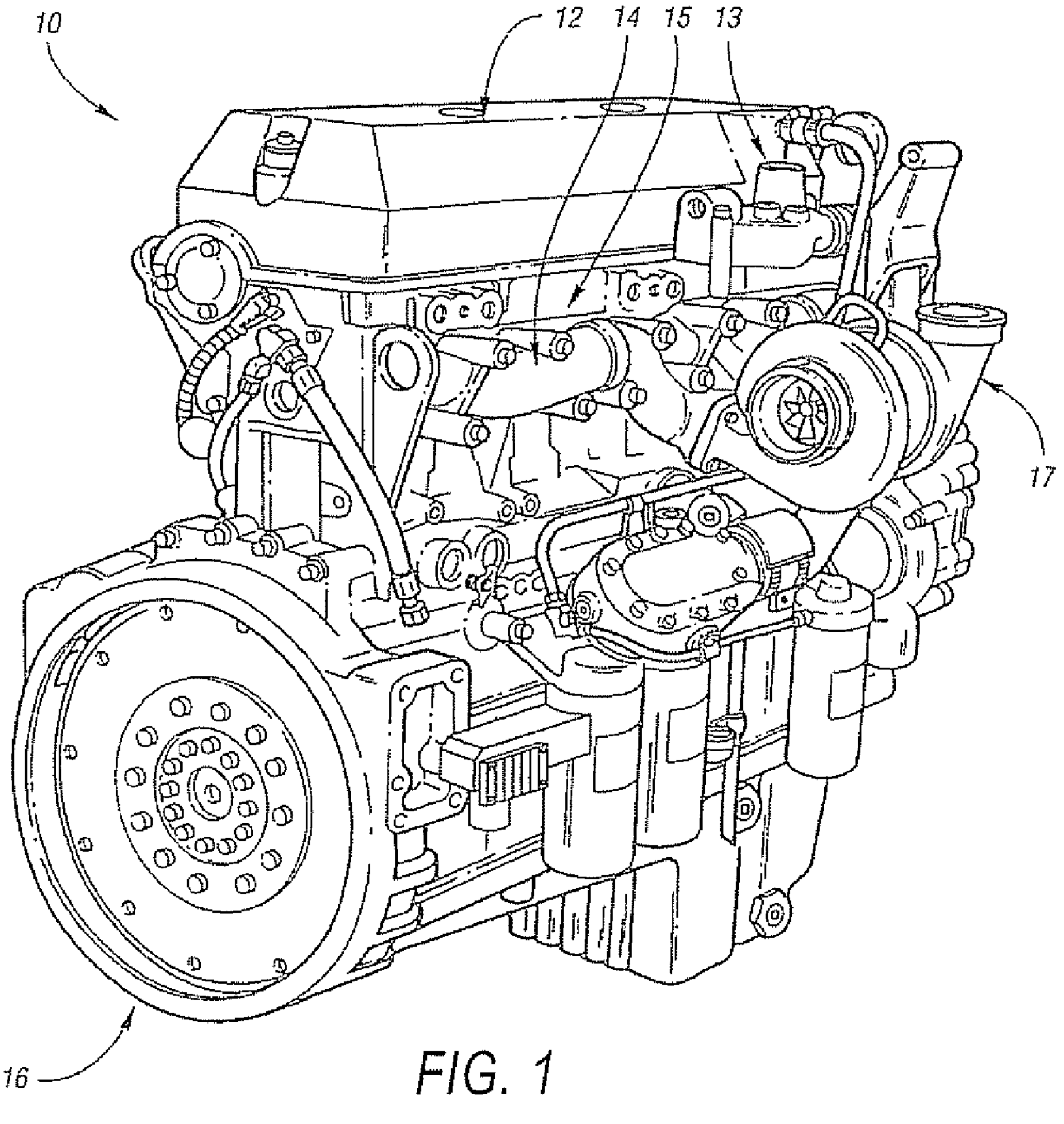
FIG. 1 is a perspective view of an electronically controlled heavy duty diesel engine.

Turning now to the drawings, and particularly to FIG. 1, there is shown a perspective view illustrating a compression-ignition internal combustion engine 10 incorporating various features according to the present invention is shown. The engine 10 may be implemented in a wide variety of applications including on-highway trucks, construction equipment, marine vessels, stationary generators, pumping stations, and the like. The engine 10 generally includes a plurality of cylinders disposed below a corresponding cover, indicated generally by reference numeral 12.

In a preferred embodiment, the engine 10 is a multi-cylinder compression ignition internal combustion engine, such as a 3, 4, 6, 8, 12, 16, or 24 cylinder diesel engine. However, the engine 10 may be implemented having any appropriate number of cylinders 12, the cylinders having any appropriate displacement and compression ratio to meet the design criteria of a particular application. Moreover, the present invention is not limited to a particular type of engine or fuel. The present invention may be implemented in connection with any appropriate engine (e.g., Otto cycle, Rankin cycle, Miller cycle, etc.) using an appropriate fuel to meet the design criteria of a particular application.

Figure 2:
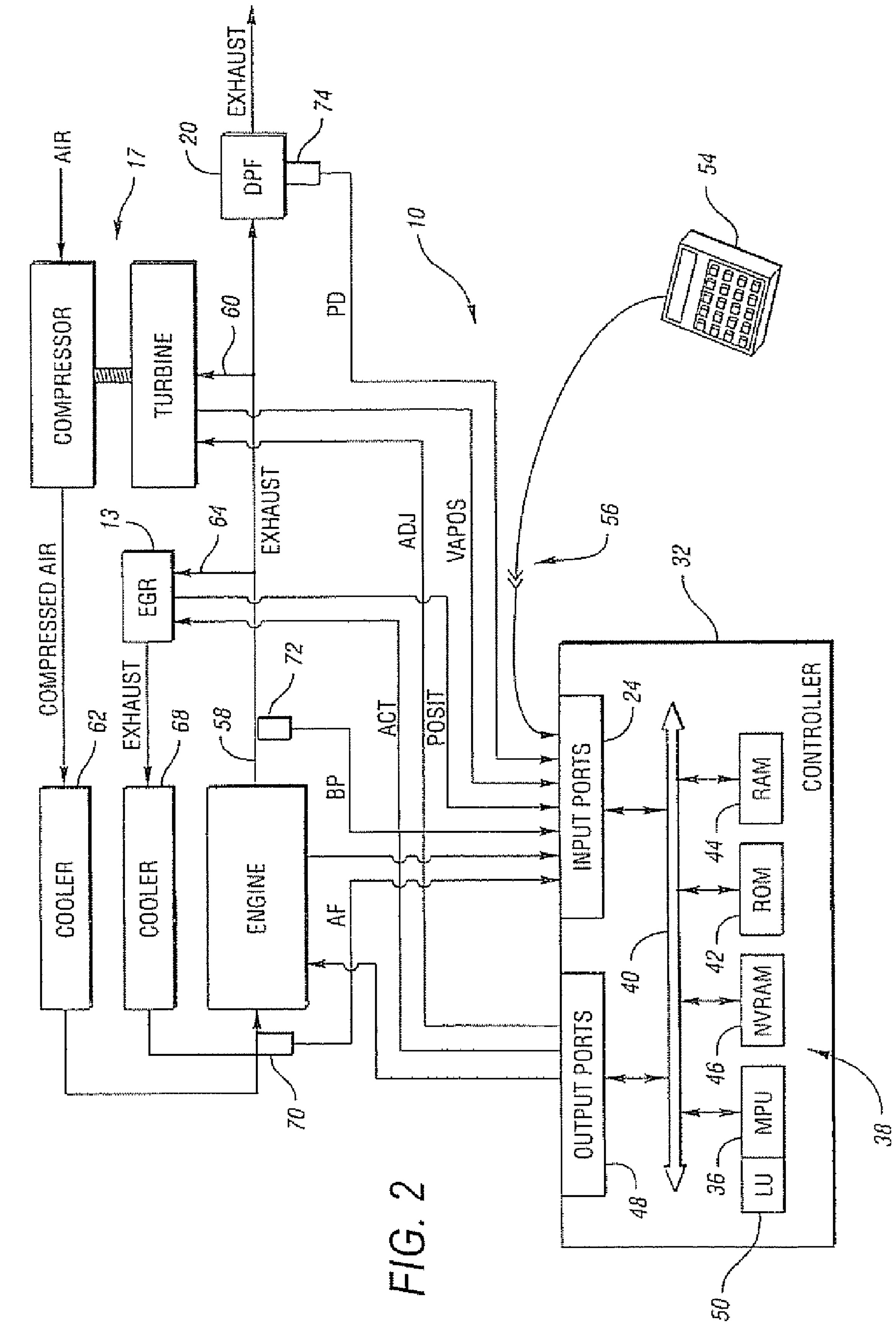
FIG. 2 is a schematic representation of a heavy duty diesel engine and an electronic control unit.

An EGR valve 13 as seen in FIG. 2, is generally connected between an exhaust manifold 14 and an intake manifold 15. The EGR valve 13 generally provides recirculation of a portion of exhaust gas in response to at least one predetermined engine 10 operating condition (e.g., a time in EGR, a load presented to the engine, a position of turbocharger turbine vanes, changing of position, i.e., opening and closing of turbocharger turbine vanes, etc.). The EGR valve 13 is generally implemented as a variable flow device. The EGR valve 13 generally includes an actuator that opens and closes the EGR valve an amount (i.e., level, to a position, etc.) that corresponds to (i.e., in response to) a control signal (e.g., ACT), and a sensor that generates a position signal (e.g., POSIT) that corresponds to (i.e., in response to) the amount of opening (or closing) of the EGR valve.

A turbocharger 17 may be installed in the engine 10 exhaust stream and may provide pressurized air to the intake manifold 15. The turbocharger 17 may be implemented as a variable geometry device (VGT, also called a variable gate turbocharger, and also called variable turbine geometry (VTG)). The VGT turbocharger 17 generally has movable turbine vanes that pivot to adjust boost pressure in response to engine speed and load. Cross-sectional changes are made by resetting the turbine blades (e.g., smaller contact surface at low speeds, smaller contact surface at high speeds). VTG turbochargers such as the VGT 17 may be particularly efficient at partial load and generally reduce or eliminate "turbo lag". VTG turbochargers can increase effective engine power, increase throttle response and can also have a beneficial effect on particulate emissions. The VGT 17 generally includes an actuator that opens and closes the VGT turbine vanes an amount (i.e., level, to a position, etc.) that corresponds to (i.e., in response to) a control signal (e.g., ADJ), and a sensor that generates a position signal (e.g., VAPOS) that corresponds to (i.e., in response to) the amount of opening of the VGT turbine vanes.

The engine 10 generally includes an engine control module (ECM), powertrain control module (PCM), or other appropriate controller 32 (shown and described in detail in connection with FIG. 2). The ECM 32 generally communicates with various engine sensors and actuators via associated interconnection cabling (i.e., leads, wires, connectors, etc.) 18, to control the engine 10 and at least one of the EGR valve 13 and the VGT 17. In addition, the ECM 32 generally communicates with an engine operator or user (not shown) using associated lights, switches, displays, and the like (not shown).

In one example, the engine 10 may be mounted (i.e., installed, implemented, positioned, disposed, etc.) in a vehicle (not shown). In another example, the engine 10 may be installed in a stationary environment. The engine 10 may be coupled to a transmission (not shown) via flywheel 16. Many transmissions include a power take-off (PTO) configuration where an auxiliary shaft (not shown) may be connected to associated auxiliary equipment (not shown). However, the present invention is independent of the particular operation mode of the engine 10, or whether the vehicle is stationary or moving for the applications in which the engine 10 is used in a vehicle having a PTO mode. The loads presented to the engine 10/transmission in a stationary configuration may be relatively constant or may vary.

Referring to FIG. 2, the internal combustion engine 10 and associated control system (or controller) 32 and subsystems are shown. Various sensors and switches (not shown) are generally in electrical communication with (i.e., are connected or coupled to) the controller 32 via input ports 24. The sensors may include various position sensors such as an accelerator or brake position sensor. Likewise, the sensors may include a coolant temperature sensor that generally provides an indication of the temperature of an engine block and an intake manifold air temperature sensor that generally provides an indication of the temperature of the engine intake air at the inlet or within the intake manifold 15. Moreover, the sensors may include an engine RPM sensor that generally provides an indication of the crankshaft rotational velocity. In addition, the sensors may include a turbocharger RPM sensor that generally provides an indication of the turbocharger shaft rotational velocity.

Likewise, an oil pressure sensor may be used to monitor the engine 10 operating conditions by providing an appropriate signal to the controller 32. Other sensors may include at least one sensor that indicates actuation (e.g., position, percentage of open, etc.) of the EGR control valve 13 (e.g., via the signal POSIT), at least one sensor that indicates actuation of the VGT 17 (e.g., via the signal VAPOS), at least one sensor that indicates actuation of at least one cooling fan, and at least one sensor that indicates rotational speed of the at least one cooling fan.

The engine 10 generally has an exhaust output that presents a portion of exhaust 58 (e.g., a portion 60) to the VGT 17 and the remainder of the exhaust gas through an exhaust system that includes a diesel particulate filter (DPF) 20.

In one example, an air flow mass (or mass air flow) sensor 70 may be implemented to provide an indication of the air flow through the engine 10 (e.g., via a signal AF). The sensor 70 is generally placed in the incoming air stream to the engine 10. The air flow sensor 70 generally presents a signal (e.g., via the signal AF) that is representative of the air mass flow to a respective input port 24.

In another example, the signal AF (i.e., the signal corresponds to the air mass flow into the engine 10) may be generated using a virtual sensor. The controller 32 may dynamically determine an appropriate value (i.e., a virtual sensor signal value) for the signal AF in real time in response to engine operating conditions as determined using signals generated by the sensors coupled to the input ports 24 as described herein. In particular, engine intake mass air flow may be directly proportional to engine RPM and intake manifold pressure and indirectly proportional to intake manifold temperature. As such, sensor signals that correspond to engine RPM, intake manifold pressure, and intake manifold temperature may be used to generate (e.g., calculate, determine, etc.) the virtual sensor signal AF. However, an appropriate virtual sensor may be determined using any appropriate parameters to meet the design criteria of a particular application. Moreover, air pressure at the turbine inlet is calculated, not measured.

Other sensors may include rotational sensors to detect the rotational speed of the engine 10, such as an RPM sensor and a vehicle speed sensor (VSS) in some applications. The VSS generally provides an indication of the rotational speed of the output shaft or tailshaft (not shown) of the transmission. The speed of the shaft monitored via the VSS may be used to calculate the vehicle speed. The VSS may also represent one or more wheel speed sensors which may be used in anti-lock breaking system (ABS) applications, vehicle stability control systems, and the like.

The controller 32 preferably comprises a programmable microprocessor 36 in communication with (i.e., coupled to) various computer readable storage media 38 via at least one data and control bus 40. The computer readable storage media 38 may include any of a number of devices such as read only memory (ROM) 42, random access memory (RAM) 44, and non-volatile (keep-alive) random access memory (NVRAM) 46.

The various types of computer-readable storage media 38 generally provide short-term and long-term storage of data (e.g., at least one lookup table, LUT, at least one operation control routine, at least one mathematical model for EGR control, etc.) used by the controller 32 to control the engine 10 and the ER valve 13. The computer-readable storage media 38 may be implemented by any of a number of known physical devices capable of storing data representing instructions executable by the microprocessor 36. Such devices may include PROM, EPROM. EEPROM, flash memory, and the like in addition to various magnetic, optical, and combination media capable of temporary and permanent data storage.

The computer-readable storage media 38 may include data representing program instructions (e.g., software), calibrations, routines, steps, methods, blocks, operations, operating variables, and the like used in connection with associated hardware to control the various systems and subsystems of the engine 10, the EGR valve 13, the VGT 17, and the vehicle. The engine/vehicle/EGR system control logic is generally implemented via the controller 32 based on the data stored in the computer-readable storage media 38 in addition to various other electric and electronic circuits (i.e., hardware, firmware, etc.). The computer readable storage media 38 generally have instructions stored thereon that may be executable by the controller 32 to control the internal combustion engine 10, including the EGR valve 13 and a variable geometry device (e.g., turbine vanes) on the turbocharger 17, and to determine the level of the virtual sensor signal AF. The program instructions may direct the controller 32 to control the various systems and subsystems of the vehicle where the engine 10 is implemented, with the instructions being executed by microprocessor 36, and optionally, instructions may also be executed by any number of logic units 50. The input ports 24 may receive signals from the various sensors and switches, and the controller 32 may generate signals (e.g., the signals ACT and ADJ) at output ports 48. The output signals are generally presented (or transmitted) to the various vehicle components (e.g., the EGR valve 13 actuator, the VGT 17 actuator, other actuators, indicators, and the like).

The actuators may include various engine components which are operated via associated control signals from the controller 32. The various actuators may also provide signal feedback to the controller 32 relative to the actuator operational state (e.g., via a respective sensor), in addition to feedback position or other signals used to control the actuators. The actuators preferably include a plurality of fuel injectors which are controlled via associated (or respective) solenoids to deliver fuel to the corresponding cylinders 12. The actuators may include at least one actuator that may be implemented to control the EGR valve 13 in response to the signal ACT, and at least one actuator to control the turbine vanes (i.e., vary the geometry of) of the VGT 17 in response to the signal ADJ.

A data, diagnostics, and programming interface 54 may also be selectively connected to the controller 32 via a bus and connector 56 to exchange various information therebetween. The interface 54 may be used to change values within the computer readable storage media 38, such as configuration settings, calibration variables, instructions for EGR and engine control, at least one constant that corresponds to the EGR valve 13 geometry, at least one constant that corresponds to the VGT 17, and the like.

As used throughout the description of the present invention, at least one selectable (i.e., programmable, predetermined, modifiable, etc.) constant, limit, set of calibration instructions, calibration values (i.e., threshold, level, interval, value, amount, duration, etc.) or range of values may be selected by any of a number of individuals (i.e., users, operators, owners, drivers, etc.) via a programming device, such as the device 54 selectively connected via an appropriate plug or connector 56 to the controller 32.

Rather than being primarily controlled by software, the selectable or programmable constant and limit (or range) values may also be provided by an appropriate hardware circuit having various switches, dials, and the like. Alternatively, the selectable or programmable limit and range may also be changed using a combination of software and hardware without departing from the spirit of the present invention. However, the at least one selectable value or range may be predetermined and/or modified by any appropriate apparatus and method to meet the design criteria of a particular application. Any appropriate number and type of sensors, indicators, actuators, etc. may be implemented to meet the design criteria of a particular application.

In at least one mode of operation, the controller 32 may receive signals from the various vehicle sensors and switches, and execute control logic embedded in hardware and software to control the engine 10, the EGR valve 13, the VGT 17, and the like. One or more of the sensors (e.g., the engine inlet air mass flow sensor 70) may be virtual sensors using control logic embedded in hardware and software. In one example, the controller 32 is implemented as at least one implementation of a DDEC controller available from Detroit Diesel Corporation, Detroit, Mich. Various other features of the DDEC controller are described in detail in a number of different U.S. patents assigned to Detroit Diesel Corporation. However, the present invention may be implemented in connection with any appropriate controller to meet the design criteria of a particular application.

Control logic may be implemented in hardware, firmware, software, or combinations thereof. Further, control logic may be executed by the controller 32, in addition to and by any of the various systems and subsystems of the vehicle or other installation where the controller 32 is implemented. Yet further, although in a preferred embodiment, the controller 32 includes the microprocessor 36, any of a number of known programming and processing techniques, algorithms, steps, bocks, processes, routines, strategies and the like may be implemented to control the engine 10, the EGR valve 13, the VGT 17, and simulate the virtual sensor 70 in accordance with the present invention. Further, the engine controller 32 may receive information in a variety of ways. For example, engine 10 systems information may be received over a data link, at a digital input, or at a sensor input of the engine controller 32.

The controller 32 generally provides enhanced engine performance by controlling the variable flow EGR valve 13 and the VGT 17. The amount of exhaust gas to be recirculated is generally controlled by the EGR valve 13. In accordance with the present invention, the EGR valve 13 comprises a variable flow valve that is electronically controlled by the controller 32. There may be many possible configurations for a controllable EGR valve, and embodiments of the present invention are not limited to any particular structure for the EGR valve 13. Further, various sensors located at the EGR valve 13, on the engine 10, and in connection with corresponding systems, subsystems, and components may detect temperature and differential pressure to provide for determination of the exhaust gas mass flow rate through the EGR valve 13 via the controller 32.

In addition, various sensor configurations may be implemented in various parts of the exhaust flow paths of the engine 10 to provide the controller 32 with appropriate signals to determine the various respective mass flow rates throughout the exhaust system (e.g., exhaust gas flow 58 from the exhaust manifold 14), including flow through the EGR system (e.g., flow 64) and flow through the turbocharger 17 compressor (e.g., flow 60), and any other flows to meet the design criteria of a particular application.

In particular, sensors are generally implemented to provide signals to respective input ports 24 that correspond to (or relate to) EGR 13 valve and actuator position, intake manifold 15 air pressure intake manifold temperature, exhaust manifold 14 exhaust gas pressure, turbocharger 17 compressor inlet air temperature, turbocharger 17 compressor inlet air pressure, a physical or virtual sensor 70 that presents a signal (e.g., the signal AF) that corresponds to air mass flow through the engine 10, and the sensor 74 that presents a signal (e.g., the signal PD) that corresponds to pressure across the DPF 20.

In at least one example, a cooler 62 may be implemented to cool the charge (i.e., compressed) air coming from the turbocharger 17. Similarly, in at least one example, a cooler 68 may be implemented to cool the exhaust gas flow from the EGR valve 13 to the intake manifold 15 through the EGR system prior to reintroduction to engine 10.

Embodiments of the present invention include control logic that processes various input signals representing various engine (or component, system, subsystem, etc.) conditions, and in turn, provides at least one EGR command (or control) signal (e.g., ACT) and at least one VGT control signal (e.g., ADJ). The EGR command (or control) signal ACT generally controls a position of the variable flow EGR valve 13 to control gas flow through the EGR exhaust gas flow path 64. The EGR position sensor generally presents a signal (e.g., POSIT) to at least one of the input ports 24. The position signal POSIT generally corresponds to (i.e., is related to) the position (e.g., percentage of opening or closing) of the EGR valve 13. The VGT control signal ADJ generally controls a position of the variable vane turbocharger 17 turbine vanes to control flow through the VGT exhaust gas flow path 60. The VGT position sensor generally presents a signal (e.g., VAPOS) to at least one of the input ports 24. The position signal VAPOS generally corresponds to the position of the VGT 17 turbine vanes.

In one embodiment, the controller 32 controls various components such as a fuel pump to transfer fuel from a source to a common fuel rail or manifold. However, in another example, the present invention may be implemented in connection with a direct injection engine. Operation of solenoids generally controls delivery of the timing and duration of fuel injection (i.e., an amount, timing and duration of fuel). While the representative engine and control system 10 illustrates an example application environment of the present invention, as noted previously the present invention is not limited to any particular type of fuel or fueling system and thus may be implemented in any appropriate engine and/or engine system to meet the design criteria of a particular application.

The sensors, switches and actuators may be implemented to communicate status and control information to the engine operator via a console (not shown). The console may include various switches in addition to indicators. The console is preferably positioned in close proximity to the engine operator, such as in a cab (i.e., passenger compartment, cabin, etc.) of the vehicle (or environment) where the system 10 is implemented. The indicators may include any of a number of audio and visual indicators such as lights, displays, buzzers, alarms, and the like. Preferably, one or more switches may be used to request at least one particular operating mode, such as climate control (e.g., air conditioning), cruise control or PTO mode, for example.

In one example, the controller 32 includes control logic to control at least one mode of operation of the engine 10 and at least one mode of operation of the EGR 13 valve and actuator system, and the VGT 17 vane and actuator system. In another example, the controller 32 may be implemented as an EGR controller and engine control may be performed via another controller (not shown). Modes of engine 10 operation that may be controlled include engine idle, PTO operation, engine shutdown, maximum permitted vehicle speed, maximum permitted engine speed (i.e., maximum engine RPM), whether the engine 10 may be started (i.e., engine start enable/disable), engine operation parameters that affect engine emissions (e.g., timing, amount and duration of fuel injection, EGR control, VGT control, exhaust air pump operation, etc.), cruise control enable/disable, seasonal shutdowns, calibration modifications, and the like.

The signal POSIT generally provides a real-time EGR valve 13 position indication that may be integrated (e.g., combined, processed, etc.) with ER flow dynamics and VGT 17 operation. The signal AF generally provides a real-time engine 10 air mass flow indication that may be integrated (e.g., combined, processed, etc.) with EGR flow dynamics and VGT 17 operation. The signal VAPOS generally provides a real-time VGT 17 turbine vane position indication that may be integrated (e.g., combined, processed, etc.) with EGR flow dynamics and VGT 17 operation.

The controller 32 (e.g., the microprocessor 46 and the memory 38) may be programmed with at least one mathematical model that may continuously capture (i.e., monitor) EGR flow dynamics, VGT 17 vane position, and pressure drop across the DPF 20 (via a number of input signals presented by sensors to the respective input ports 24). The controller 32 may continuously generate the real-time EGR valve 13 control signal ACT and the VGT 17 control signal ADJ to continuously adjust (i.e., set, modify, control, select, etc.) the EGR valve 13 position (or opening) and the VGT 17 turbine vane position (i.e., VGT geometry), respectively, and estimations of diesel engine emissions in real-time.

That is, a desired change for EGR valve discharge coefficient is added to the discharge coefficient calculated as the preview sample time to continuously generates an EGR actuator position control signal (e.g., the signal ACT). The value (i.e., amount, level, etc.) that is determined (i.e., calculated, set, etc.) for the signal ACT generally integrates (e.g., combines, processes, etc.) the FOR valve 13 position feedback, EGR valve actuator delay, intake air and exhaust gas flow dynamics (e.g., delays) in connection with EGR valve discharge coefficient relationships as determined in response to the EGR valve 13 position (i.e., the signal POSIT).

The present invention generally provides for controlling the exhaust gas such as NOx emissions from a compression ignition internal combustion engine (e.g., the engine 10) having a variable geometry turbocharger (e.g., the VGT 17) by determining turbine pressure inlet and air mass flow into the engine, vane position of the VGT to provide air mass flow increase in response to turbine pressure inlet charges.

The controller 32 generally controls positioning the vanes of the VGT 17 such that the air mass flow through the engine 10 is increased linearly, and a decrease in EGR flow is controlled proportionally to the air mass flow increase.

The controller 32 generally provides calibrating limits on the amount of air flow increase and the amount of EGR flow decrease to provide substantially the same exhaust gas emissions during steady state and transitional modes of operation of the engine 10.

The controller 32 generally determines rate of change of the air mass flow, and prevents overclosure of the VGT 17 vanes by stopping the closing of the vanes of the VGT 17 when a positive rate of change of the air mass flow occurs.

The controller 32 generally determines engine NOx emissions, and controls the position of the VGT 17 vanes in response to the engine NOx emissions. The controller 32 generally determines engine 10 injection timing, and controls the position of the VGT 17 vanes in response to the engine injection timing.

The controller 32 may provide hysteresis (i.e., the lagging or retardation of an effect behind its cause) to control of the position of the VGT 17 vanes to minimize VGT 17 vane opening and closing transitions. The hysteresis may include at least one of providing a predetermined time of operation at any mode prior to the transition to another mode, and determining a change in the level of any of the signals AF, BP (calculated turbine inlet pressure) and PD by respective predetermined amounts prior to presenting the signal ADJ.

Figure 3:
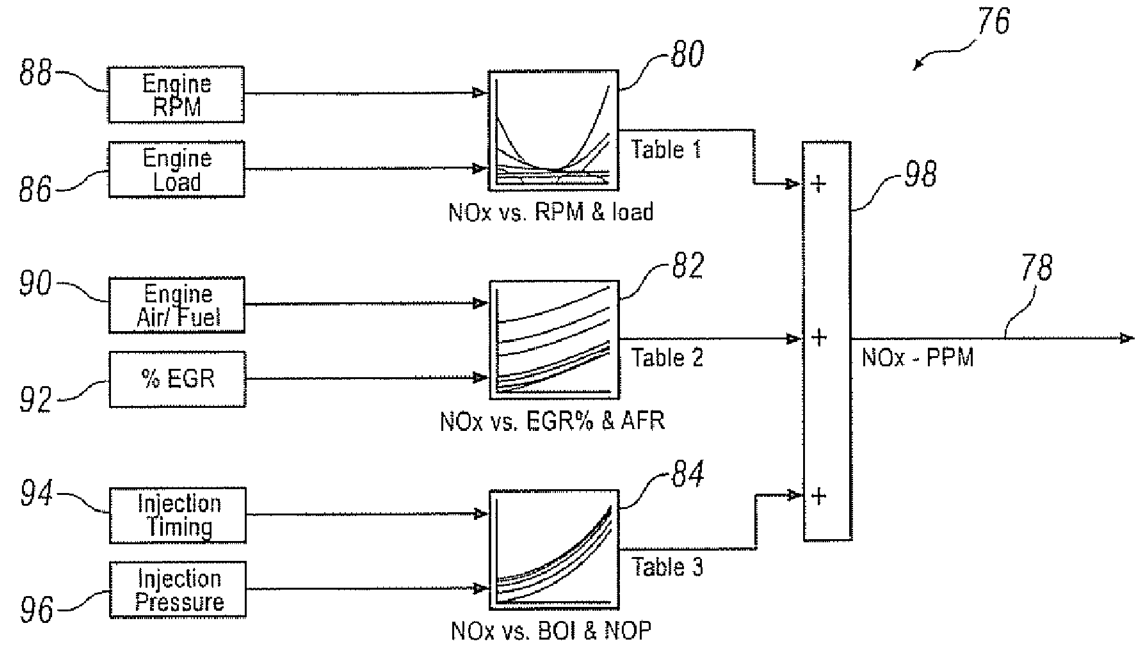
FIG. 3 is a schematic representation of a Table Based, Steady State NOx Estimation Algorithm.

FIG. 3 is a schematic representation of an algorithm model of and estimation of a steady state, table-based steady state NOx-concentration in parts-per-million (PPM) Estimation Algorithm 76 that sets for accurate, real-time estimation of engine-out emissions which is made difficult by the computationally intensive nature of phenomenological engine emissions models, which prevents real-time operation when applied to engine control units (ECU). The technique described below enables real-time, on-board diesel engine emissions estimation with an empirical, table-based approach that accounts for up to eight (8) input parameters, for optimum emissions estimation under steady-state or transient engine operation.

Such emissions estimation is rendered desirable because diesel particulate filters (DPF) controls require some estimation of engine-out NOx (for passive regeneration purposes) and engine-out PM (for filter loading purposes) and no physical sensors are known to the inventors to exist that meet the durability and reliability requirements associated with heavy duty truck applications.

Steady State NOx model 78 is made of a combination of three (3) two-dimensional tables 80, 82 and 84, whose inputs are engine speed 86 (from crankshaft magnetic pick-up sensors), engine load 88 (or fueling rate control signal) and fresh air flow rate 90 (or intake manifold pressure), EGR flow rate 92 (or % EGR, as measured by a venturi ΔP sensor or hot-film mass flow sensor, or estimated using mass balance across the engine intake and exhaust systems), injection timing 94 (or injection timing control signal), and injection pressure 96 (or injection pressure control signal), respectively.

Figure 4:
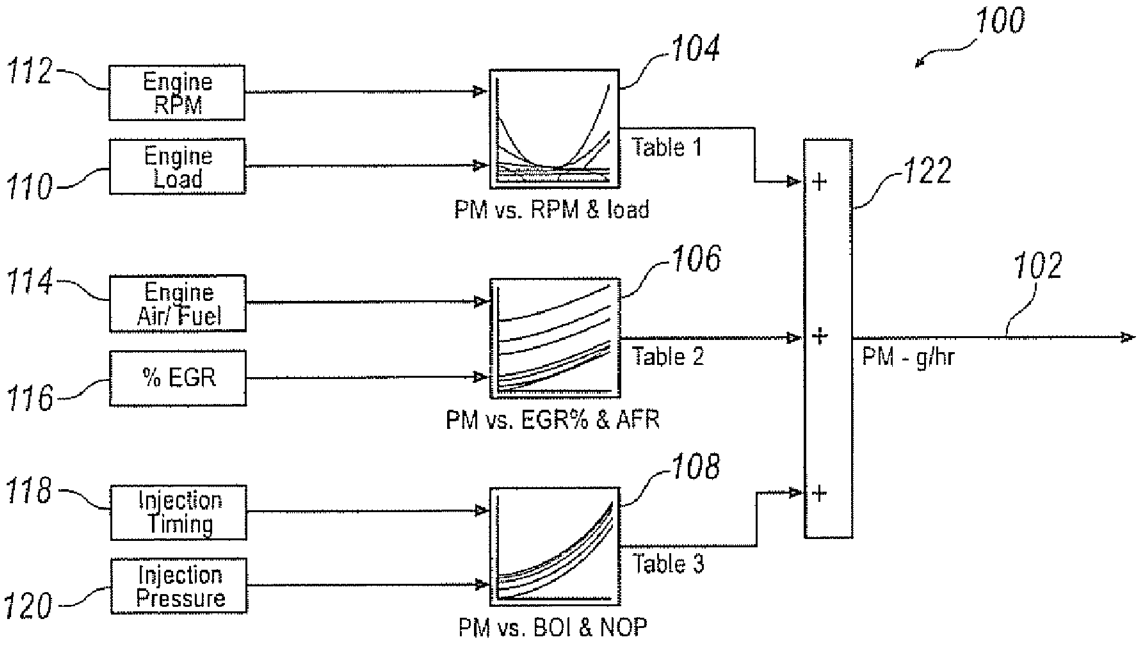
FIG. 4 is a schematic representation of a Table Based, steady State PM estimation Algorithm.

The outputs of individual tables are summed at 98 and the summation output is saturated to avoid possible extrapolation beyond practical limits. Output unit is preferably gram/lour or when concentration is required, molar parts per million (PPM). The steady state NOX values are populated in tables in memory as described hereinafter Turning to FIG. 4, a schematic representation of a Steady-State Particulate Matter (PM) Algorithm Model 100 is shown, Due to the very low engine-out particulate matter concentration during steady-state engine operation, and the resolution requirements of PM estimation of DPF soot loading control purposes, the steady-state PM model is made of a combination of three (3) two-dimensional tables 104, 106 and 108, whose outputs 102, when summed, provide an estimation of PM in grams per hour. The PM table inputs are engine speed 110 (from crankshaft magnetic pick-up sensors), engine load 112 (or fueling rate control signal), Engine fresh air flow rate 114 (or intake manifold pressure), EGR flow rate 116 (or % EGR, as measured by a venturi ΔP sensor or hot-film mass flow sensor, or estimated using mass balance across the engine intake and exhaust systems), injection timing 118 (or injection timing control signal); and injection pressure 120 (or injection pressure control signal). The outputs of individual tables are summed at 122 and the summation output is saturated to avoid possible extrapolation beyond practical limits. Output unit is preferably measured in gram/hour.

Figure 5:
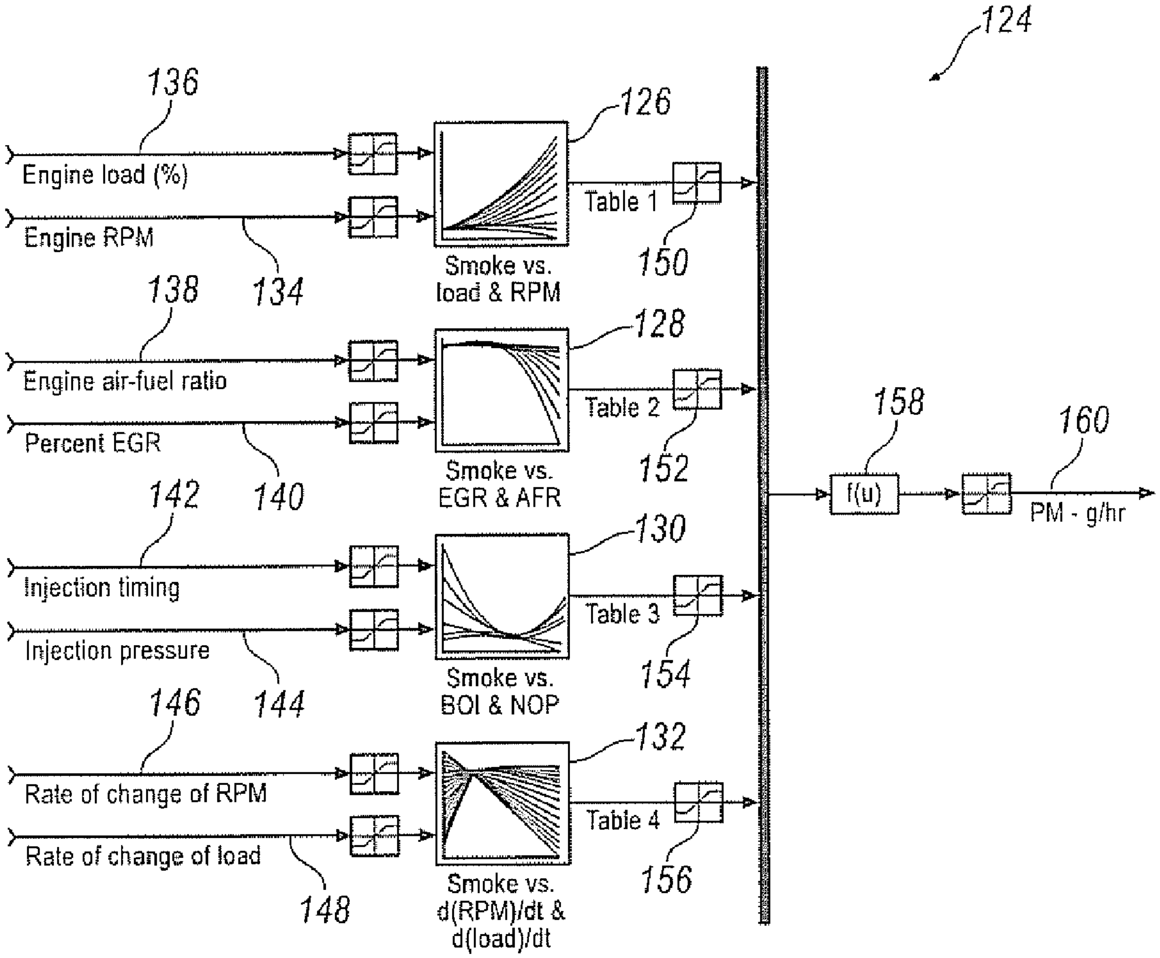
FIG. 5 is a schematic representation of a Table Based, Transient Particulate Matter Estimation Algorithm.

FIG. 5 is a schematic representation of Transient State Particulate Matter (PM) Algorithm Models 124. The transient PM model is made of a combination of four (4) two-dimensional tables 126, 128, 130, and 132, whose inputs, respectively, are engine speed 134 (from crankshaft magnetic pick-up sensors), engine load 136 (or fueling rate control signal), fresh air flow rate 138 (or intake manifold pressure), EGR flow rate 140 (or % EGR, as measured by a venturi ΔP sensor or hot-film mass flow sensor, or estimated using mass balance across the engine intake and exhaust systems) injection timing 142 (or injection timing control signal), injection pressure 144 (or injection pressure control signal), rate of change of engine RPM 146, and rate of change of engine load 148 (or fueling rate). The rate of change of RPM and load are differenced-based derivatives, with moving average over several sample times, so as to smooth the signals. The outputs of individual tables are summed at 150, 152, 154, and 156, respectively and the summation output is saturated at 158 to avoid possible extrapolation beyond practical limits. Output 160 unit is preferably measured in gram/hour.

Figure 6:
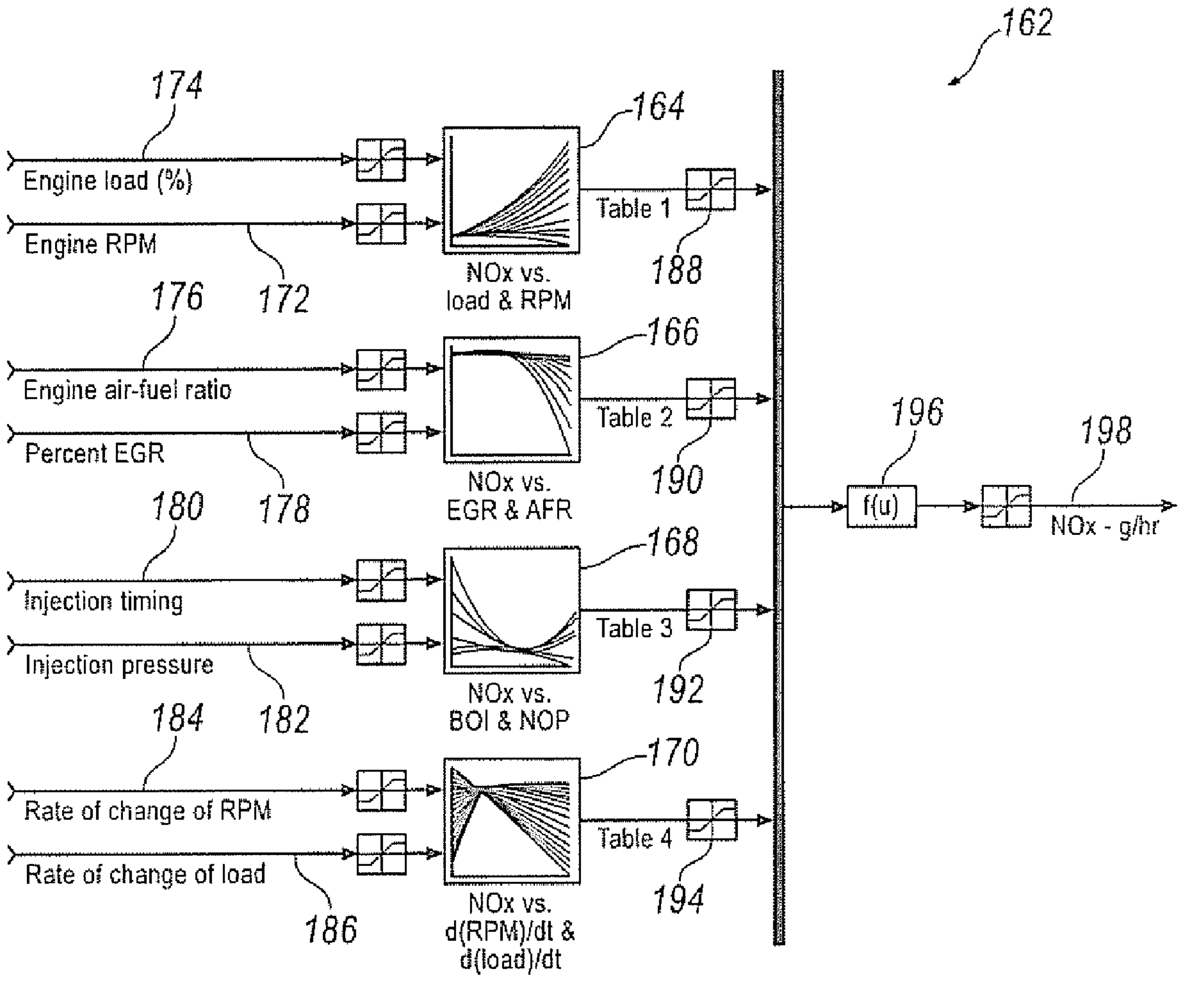
FIG. 6 is a schematic representation of a Table Based. Transient NOx Estimation Algorithm.

FIG. 6 is a schematic representation of the Transient State NOx Algorithm Model. The transient state NOx model 162 is made of a combination of four (4) two-dimensional tables 164, 166, 168 and 170, whose inputs, respectively, are engine speed 172 (from crankshaft magnetic pick-Lip sensors), engine load 174 (or fueling rate control signal), fresh air flow rate 176 (or intake manifold pressure), EGR flow rate 178 (or % EGR, as measured by a venturi ΔP sensor or hot-film mass flow sensor, or estimated using mass balance across the engine intake and exhaust systems) injection timing 180 (or injection timing control signal), injection pressure 182 (or injection pressure control signal), rate of change of engine RPM 184, and rate of change of engine load 186 (or fueling rate). The rate of change of RPM and load are differenced-based derivatives, with moving averages over several sample times, so as to smooth the signals. The outputs of individual tables are summed at 188, 190, 192, and 194, respectively, and the summation output is saturated at 196 to avoid possible extrapolation beyond practical limits. Output 198 unit is preferably gram/hour or, when concentration is required, molar parts per million (PPM).

The switch between steady-state and transient models, for real-time emissions estimation, is based on rate of change of RPM. As rate of change of RPM exceeds a predetermined value (e.g., 10 RPM/sec.) transient models for NOx and PM are used.

In each of the models described above, generating the tables involves gathering existing engine data for the signals listed above, and using a typical second order mapping technique. The underlying mapping model is as follows:

$$z=c_1x^2+c_2x+c_3y^2+c_4y+c_5x^2y^2+c_6xy+c_7x^2y+c_8xy^2+c_9$$

Where, z is the table output x is the table's first input (row input)

y is the table's second input (column input)

$c_1$, $c_2$, $c_3$, $c_4$, $c_5$, $c_6$, $c_7$, $c_8$, and $c_9$ are the coefficients of the polynomial.

The mapping assumes a fixed model of the type:

$$z=a*c$$

Where a is the following vector:

$$a=[x^2\ x\ y^2\ y\ x^2y^2\ xy\ x^2y\ xy^2\ 1]$$

And solves for the coefficients of the vector c:

$$c=[a'*a]^{-1}*a'*z$$

The words used in the description of the above invention are words of description, and not words of limitation. Those skilled in the art recognize that many variations and modifications are possible without departing form the scope and sprit of the invention as set forth in the appended claims.

What is claimed as new and desired to be protected by Letters Patent of the United States is:

1. A method to operate an electronically controlled internal combustion engine equipped with an electronic control unit (ECU) having memory and tables resident therein to provide real time estimation of engine out emissions; said method comprising:

determining a steady state NOx model for engine emissions based a combination of more than one two dimensional tables whose inputs are engine speed, engine load, fresh air flow rate, EGR flow rate, injection timing and injection pressure to populate tables in memory with values, summing outputs of said tables and saturating the outputs to populate tables in memory with values representative of steady state NOx emissions;

determining a steady state particulate matter model for engine emissions based upon a combination of more than one two dimensional tables whose inputs are engine speed, engine load, fresh air flow rate, EGR flow rate, injection timing and injection pressure to populate tables in memory with values, summing outputs of said tables and saturating the outputs to populate tables in memory with values representative of steady state particulate matter emissions;

determining a transient NOx model made of a combination of two dimensional tables whose inputs are engine speed, engine load, fresh air flow rate, EGR flow rate, injection timing, injection pressure, rate of change of engine speed and rate of change of engine load, summing outputs of said tables and saturating the outputs to populate tables in memory with values representative of steady state particulate matter emissions;

determining a transient particulate matter model made of a combination of two dimensional tables whose inputs are engine speed, engine load, fresh air flow rate, EGR flow rate, injection timing, injection pressure, rate of change of engine speed and rate of change of engine load, summing outputs of said tables and saturating the outputs to populate tables in memory with values representative of steady state particulate matter emissions; and switching between steady state and transient models for real time estimation of engine emissions based upon a rate of change of engine speed.

2. The method of claim 1, wherein said steady state NOx model is made based upon a combination of three two dimensional tables.

3. The method of claim 1, wherein said steady state particulate models is made based upon a combination of three two dimensional tables.

4. The method of claim 1, wherein said transient state NOx model is made upon a combination of four two dimensional tables.

5. The method of claim 1, wherein said transient particulate matter model is made based upon a combination of four two dimensional tables.

6. The method claim 1, wherein when said engine switches operation from a steady state model to a transient state model when the engine speed rate of change exceeds 10 RPM per second.

7. The method of claim 1, further including generation said tables according to the formula:

$$z=c_1x^2+c_2y^2+c_3y^2+c_4y+c_5x^2y^2+c_6xy+c_7x^2y+c_8xy^2+c_9$$

wherein:

z is the table output;

$$z=a*c$$

a is the following vector:

$$a=[x^2\ x\ y^2\ y\ x^2y^2\ xy\ x^2y\ xy^2\ 1]$$

$$c=[a'*a]^{-1}*a'*z$$

x is the tablets first input (row input)

y is the table's second input (column input)

$c_1$, $c_2$, $c_3$, $c_4$, $c_5$, $c_6$, $c_7$, $c_8$, and $c_9$ are the coefficients of the polynomial.

8. The method of claim 1, wherein said engine speed is determined from crankshaft magnetic pick-up sensors.

9. The method of claim 1, wherein fresh air flow rate is determined from at least one of a percentage of EGR as measured by a venture across a differential pressure sensor or hot film mass flow sensor, or as an estimation using mass balance across an engine intake and exhaust system.

10. The method of claim 1, wherein said change of engine load is determined by a change in fueling rate of the engine.

* * * * *